United States Patent [19]

Box, Jr. et al.

[11] 4,304,687

[45] Dec. 8, 1981

[54] CATALYST FOR THE PURIFICATION OF POLLUTED WATER

[75] Inventors: E. O. Box, Jr.; Floyd E. Farha, Jr., both of Bartlesville, Okla.

[73] Assignee: Phillips Petroleum Company, Bartlesville, Okla.

[21] Appl. No.: 197,460

[22] Filed: Oct. 16, 1980

Related U.S. Application Data

[60] Division of Ser. No. 96,715, Nov. 21, 1979, Pat. No. 4,268,399, which is a continuation-in-part of Ser. No. 877,539, Feb. 13, 1978, abandoned.

[51] Int. Cl.³ .................. B01J 21/06; B01J 23/06; B01J 23/34; B01J 23/72
[52] U.S. Cl. .................................. 252/462; 252/471; 252/475
[58] Field of Search .................. 252/462, 471, 475

[56] References Cited

U.S. PATENT DOCUMENTS

| | | | |
|---|---|---|---|
| 3,823,088 | 7/1974 | Box et al. | 210/63 |
| 3,929,670 | 12/1975 | Kudo et al. | 252/462 X |
| 4,144,277 | 3/1979 | Walker et al. | 252/461 X |
| 4,228,040 | 10/1980 | Bertus et al. | 252/475 |

FOREIGN PATENT DOCUMENTS 384473 12/1932 United Kingdom.

Primary Examiner—W. J. Shine

[57] ABSTRACT

The purity of organically polluted waters is improved by contacting with a zinc titanate catalyst under oxidizing conditions. In one embodiment, an aqueous stream containing oxidizable organic pollutants is subjected to oxidizing conditions in the presence of a metal promoted zinc titanate catalyst to improve the purity of the aqueous product. In a second embodiment, an aqueous stream containing oxidizable organic pollutants is subjected to oxidizing conditions in the presence of a metal promoted zinc titanate catalyst to convert the water to a potable aqueous product.

8 Claims, No Drawings

CATALYST FOR THE PURIFICATION OF POLLUTED WATER

This application is a division of application Ser. No. 096,715, filed Nov. 21, 1979, now U.S. Pat. No. 4,268,399, which is a continuation-in-part of application Ser. No. 877,539, filed Feb. 13, 1978, now abandoned.

This invention relates to a process for improving the purity of organically polluted waters. In accordance with one aspect, this invention relates to a continuous process for the abatement of water pollution by removing oxidizable organic wastes from aqueous streams by oxidizing at least a portion of these compounds in the presence of a metal promoted zinc titanate catalyst. In accordance with another aspect, this invention relates to a process for converting organic contaminated aqueous streams to fresh potable water by oxidation in the presence of a zinc titanate catalyst.

The problem of disposing of waste-containing waters has, in recent years, become more acute due to increasing population and increasing industrial activity. This particularly is true of waters which are polluted by the presence of organic materials such as waters discharged in a chemical process. Frequently, such waste waters contain organic materials in concentrations far too low for them to be conveniently or economically recoverable, yet in concentrations so high that it is impractical and undesirable to simply pump the waste water into available streams, rivers, lakes or ponds.

In a recently developed process known as oxidative dehydrogenation and particularly butene dehydrogenation process, an oxygen-containing gas is fed to the catalytic reaction zone containing a catalyst along with the butene feed and steam, and a substantial portion of the hydrogen produced by dehydrogenation is combusted to water vapor. This not only removes the inhibiting effect of the hydrogen on further dehydrogenation, but also supplies heat to this endothermic reaction resulting in high conversion and per-pass yield of butadiene at relatively good selectivity. By this method, additional steam is produced which is recovered from the process effluent as condensate. Also, moderate concentrations of oxygenated hydrocarbons and other oxidizable organic pollutants are generated which appear in the condensed steam and/or in the hydrocarbon effluent.

The term "oxidizable pollutants", as used herein, refers to the dissolved and suspended organic by-products associated with catalytic oxidative dehydrogenation such as undesirable paraffins, olefins, naphthenes, aromatics, as well as oxygenated compounds such as acids, aldehydes, ketones, alcohols, and ethers.

The oxygen used in the dehydrogenation is present in an excess in order to insure complete conversion of hydrogen released in the dehydrogenation reaction. Therefore, the effluent from the dehydrogenation reaction will contain unreacted oxygen gas as well as oxidizable pollutants. This residual oxygen and oxidizable pollutants have been found to be detrimental to the further processing of the hydrocarbon product. It is, therefore, necessary that the oxygen and oxygen-containing compounds be removed from the effluent streams. Under normal plant operating conditions, these by-products will ultimately be fed into the atmosphere and/or discharged with waste water and/or end up in a heavy hydrocarbon-containing fraction, depending upon the separation and recovery processes employed and their operating conditions.

Some processes are known in which oxygen-containing waste waters can be subjected to air-oxidation under elevated temperatures. Such air-oxidation converts most or all of the organic matter into "innocuous materials" such as carbon dioxide and/or water vapor. This reaction is sometimes carried out in the presence of catalysts to promote the oxidation and to allow the reaction to be carried out under less severe conditions.

Although a number of catalysts and catalytic processes are known to carry out such air-oxidations, not all catalysts which have activity for promoting oxidation have been found to be suitable. The conditions under which small amounts of organic wastes are oxidized in the presence of large amounts of water are relatively severe. The present invention provides a catalyst and process to achieve this purpose. The outstanding feature of the invention is the activity and durability of the catalyst system.

Accordingly, an object of this invention is to provide a process for improving the purity of aqueous streams containing oxidizable organic pollutants.

Another object of this invention is to provide a catalyst system for use in oxidation of pollutants.

Other objects, aspects and advantages of this invention will be readily apparent to those skilled in the art from a reading of the specification and appended claims.

In accordance with the present invention there is provided a process for improving the purity of an aqueous stream contaminated with oxidizable pollutants by contacting said contaminated aqueous stream under oxidative conditions with a zinc titanate catalyst to thereby convert at least a portion of the oxidizable pollutants to innocuous materials. Recycle of the thus purified aqueous stream or a long contact time may be utilized, if required, to produce a potable aqueous product.

The term "zinc titanate", as used herein, refers to a calcined composition consisting essentially of zinc, titanium and sufficient oxygen to satisfy the valence requirements of zinc and titanium, wherein the atomic ratio of zinc to titanium is in the approximate range of 1:1 to 3:1, preferably 1.5:1 to 2.5:1. Especially preferred is a zinc titanate composition wherein the atomic ratio of zinc to titanium is 2:1, which corresponds to zinc orthotitanate.

Although an unpromoted zinc titanate catalyst demonstrates activity to oxidize organic pollutants in water, the activity of this catalyst can be further increased by incorporating therein a promoter metal.

Thus, in one embodiment of this invention, a zinc titanate catalyst can also additionally have at least one promoter at least one member of which is selected from the group consisting of the metals of Groups IB and VIIB, of the Periodic Table of the Elements as presented at page B-2 of the "Handbook of Chemistry and Physics", 45th Edition, 1964, and compounds thereof.

The preferred Group IB metal is copper while the preferred Group VIIB metal is manganese. The preferred at least one promoter for the zinc titanate catalyst is a mixture of copper and manganese.

In another embodiment of this invention, the activity of a zinc titanate catalyst promoted with a Group IB metal and/or a Group VIIB metal is also enhanced further and catalyst lifetime extended by incorporating therein a promoting amount of a second promoter at least one member of which is selected from the group consisting of the rare earth metals and compounds thereof. Such catalysts exhibit extended catalyst life and improved catalyst stability in that little, if any, promoting metal is lost during actual use.

Some examples of rare earth metals which can be employed include the cerium group rare earth elements such as lanthanum and cerium.

In the most preferred embodiment of this invention, a zinc titanate catalyst is promoted with copper, manganese and lanthanum.

The zinc titanate can be prepared using any conventional method of preparation. One particularly suitable method is to intimately blend a mixture of zinc oxide and titanium dioxide, in essentially stoichiometric proportions, followed by a calcination step wherein the mixture is heated in air at temperatures of 650°–1050° C. (1202°–1922° F.). Prior to the calcination, the mixtures can be formed into conventional catalyst shapes such as pellets, extrudates, agglomerates, and the like. Some or all of the zinc titanate is in the spinel form.

The zinc titanate catalyst can also be prepared by coprecipitation from aqueous solutions of a zinc and titanium salt. The aqueous solutions are mixed together and the hydroxides precipitated by the addition of an alkali, such as MOH where M is an alkali metal. The precipitate is then washed, dried and calcined, as above.

The promoter metals are preferably incorporated into the zinc titanate catalyst material by impregnation with aqueous solutions of soluble compounds of the promoter metals. These promoter metal compounds are preferably those compounds which are convertible to the metal or to the oxide of the metal on calcination, that is, they contain essentially no other elements which are not volatilizable during the calcination step. The concentration of promoter metal on the zinc titanate after calcination will generally be in the range of 0.05–20 weight percent, preferably 0.1–10 weight percent, calculated as the metal and based upon the weight of the zinc titanate support material.

The aqueous wastes which are applicable as feeds for the process of the present invention are those which contain minor amounts of dissolved and/or suspended organic materials. The process is particularly applicable for feeds in which the organic materials are hydrocarbons and/or oxygenated hydrocarbons. The organic materials can be present in the predominantly aqueous stream in a broad range of concentrations, but will ordinarily be present in amounts less than about 10 weight percent. It is generally more convenient to characterize the aqueous feeds by the total carbon content. Consequently, such feeds can contain from about 10 to about 100,000 p.p.m. carbon, more frequently 25 to about 10,000 p.p.m. carbon, still more frequently 100–5,000 p.p.m. carbon.

Such aqueous waste streams can be derived from any source such as chemical or biological sources. For best results, the aqueous waste streams will contain relatively little non-volatile and/or non-oxidizable inorganic materials.

The process of the present invention can be carried out under a variety of conditions depending on the feedstock, catalyst, the desired degree of organic removal, and whether a liquid phase or vapor phase operation is desired. The reaction can be carried out in any suitable apparatus and can be carried out either batchwise or continuously. Continuous operation through a fixed catalyst bed is presently preferred such as downflow operation through a vertically positioned fixed catalyst bed. However, other modes of reaction can be used.

In liquid phase operation, the temperature within the reaction zone will generally be 350°–550° F. (177°–288° C.), preferably 400°–500° F. (204°–260° C.), and under a sufficient pressure to maintain a liquid phase within the reaction zone. For purposes of economy, substantially only that pressure necessary to maintain the liquid phase is used, although pressures of up to 2,000 p.s.i.g. can be used. It will be understood that even in this liquid phase type of operation, there will be a substantial vapor phase present in addition to the liquid phase. This is because of the air which is used as the oxidant and because of the gaseous products of oxidation. In the liquid phase mode of operation, the molar ratio of water to air in the reaction zone will be in the range of 10:1 to 200:1, preferably 25:1 to 50:1. At least enough oxygen-containing gas must be employed to oxidize completely the organic contaminants present. A preferred range would be 50 to 100 percent excess oxygen. The water feed will generally pass through the reaction zone at a rate of 0.1–10, preferably 2–5, LHSV.

In vapor phase operation, the temperatures can be 600°–1200° F. (316°–649° C.), preferably 900°–1000° F. (482°–538° C.), and at any convenient pressure which will permit operation in the vapor phase. Generally, pressures from atomspheric to about 100 p.s.i.g. will be used. The molar ratio of feed water to air will be 10:1 to 200:1, preferably 80:1 to 150:1. The feed water rate can be in the range of 0.1–50, preferably 20–40, GHSV.

It can be seen from the above that, in vapor phase operation which utilizes higher temperatures, much higher space rates can be utilized. Nevertheless, because vapor phase operation requires the vaporization of relatively large quantities of water, it is presently preferred to operate under liquid phase conditions.

The catalysts utilized in the process of the present invention are active and relatively long-lived. However, under the extreme conditions which are typical of the process, some of the promoter metals may be slowly lost from the catalyst. Such minor losses will not ordinarily influence the effectiveness of the catalyst. If over long periods of time the catalyst does lose a substantial portion of its activity, the activity of the catalyst can be improved either by calcination in air or by reimpregnation with an additional quantity of promoter metal followed by calcination in air.

Unless the concentration of oxidizable pollutants is extremely low in the aqueous stream to be treated, it will generally be necessary to recycle the aqueous stream through the reaction zone a number of times to achieve a potable aqueous product. If it is desired to produce a potable aqueous product, the polluted aqueous stream may simply be recycled through the reaction zone until a desired level of purity is obtained.

EXAMPLE I

Preparation of Zinc Orthotitanate

A zinc titanate catalyst was prepared by slurrying 162 grams (2.0 moles) of powdered zinc oxide and 80 grams (1.0 mole) of powdered titanium dioxide in 1200 cc of water. The resulting slurry was mixed in a blender for 15 minutes, then dried in a forced draft oven at 220° F. (105° C.). The dry cake was ground, sieved to obtain particles that passed a 40 mesh sieve (U.S. Series), mixed with 14 grams of powdered polyethylene, and formed into ¼ inch diameter tablets. The tablets were calcined by a heating sequence which included 2 hours at 800° F. (427° C.), 2 hours at 1000° F. (538° C.), and finally 4 hours at 1500° F. (816° C.). The tablets were broken up and screened to −8+20 mesh size granules (U.S. Sieve Series).

EXAMPLE II

Preparation of Metal-Promoted Zinc Titanate Catalyst

A 28.5 gram quantity of zinc orthotitanate prepared as in Example I was impregnated with an aqueous solution containing 1.14 gm copper, 0.575 gm manganese, and 0.28 gm lanthanum as nitrates. The zinc orthotitanate granules were soaked with this solution until essentially all the liquid was absorbed. The impregnated granules were then dried in an oven at 266° F. (130° C.), calcined in air at 1000° F. (538° C.). Based on the weight of zinc orthotitanate support, this catalyst comprised 4 weight percent copper, 2.0 weight percent manganese, and 1.0 weight percent lanthanum.

EXAMPLE III

Catalysts prepared in Examples I and II were used to oxidize aqueous solutions of organic wastes. These aqueous solutions were obtained from process water associated with the catalytic oxidative dehydrogenation of butenes to butadiene. The water contained various amounts of dissolved and suspended by-products such as paraffins, olefins, naphthenes, aromatics, as well as oxygenated compounds such as acids, aldehydes, ketones, alcohols, and ethers.

In each run, a twenty-five cc portion of catalyst was charged into a tubular fixed bed reactor which was vertically positioned. A mixture of air and waste water containing 700 p.p.m. organic carbon was continuously and downwardly passed through the reactor. After a period of time on stream, the effluent of the reaction zone was sampled and analyzed for residual organic content in terms of p.p.m. carbon.

In runs 1 and 2, the zinc orthotitanate catalyst was unpromoted; whereas in runs 3–5, the zinc orthotitanate catalyst was promoted with 4 percent copper, 2 percent manganese, and 1 percent lanthanum. The essential conditions as well as the results of the tests are shown in Table I.

Invention runs 1–5 in Table I demonstrate that, while unpromoted zinc orthotitanate is effective to destroy nearly fifty percent of the initial organic compounds, the same material promoted with 4 percent copper, 2 percent manganese, and 1 percent lanthanum is effective to destroy over eighty percent of the organic compounds.

Reasonable variations and modifications which will be apparent to those skilled in the art can be made in this invention without departing from the spirit and scope thereof.

What is claimed is:

1. A composition useful as a catalyst comprising zinc titanate and a first promoter at least one member of which is selected from the group consisting of the metals of Group IB of the Periodic Table, the metals of Group VIIB of the Periodic Table, and compounds thereof.

2. A composition in accordance with claim 1 wherein said first promoter is a mixture of copper and manganese.

3. A composition in accordance with claim 1 additionally comprising a second promoter at least one member of which is selected from the group consisting of the rare earth metals and compounds thereof.

4. A composition in accordance with claim 3 wherein said first promoter is a mixture of copper and manganese and said second promoter is lanthanum.

5. A composition in accordance with claim 3 wherein the concentration of said first promoter and said second promoter in said composition is 0.05–20 weight percent calculated as the metal based on the weight of the zinc titanate.

6. A composition in accordance with claim 3 wherein the concentration of said first promoter and said second promoter in said composition is 0.1–10 weight percent calculated as the metal and based on the weight of the zinc titanate.

7. A composition in accordance with claim 1 wherein the atomic ratio of zinc to titanium in said composition is in the range of 1:1 to 3:1.

8. A composition in accordance with claim 1 wherein the atomic ratio of zinc to titanium in said composition is in the range of 1.5:1 to 2.5:1.

* * * * *

TABLE I

Liquid Phase Catalytic Air-Oxidation of Aqueous Wastes Over Zinc Orthotitanate Catalysts

| Run No. | Weight Percent Promoter Metal | Temperature °F. | Pressure, psig | Water: Air, Mole Ratio | Water Rate LHSV | Hours On Stream | Carbon In Effluent p.p.m. | Carbon Removal, Percent |
|---|---|---|---|---|---|---|---|---|
| 1 | None | 475 | 695 | 32.2 | 4.16 | 1.4 | 330 | 53 |
| 2 | None | 473 | 695 | 30.3 | 4.56 | 2.5 | 347 | 51 |
| 3 | 4Cu-2Mn-1La | 471 | 695 | 27.4 | 4.20 | 1.4 | 92 | 87 |
| 4 | 4Cu-2Mn-1La | 471 | 695 | 30.9 | 4.64 | 3.0–4.4 | 95 | 86 |
| 5 | 4Cu-2Mn-1La | 471 | 695 | 26.7 | 4.60 | 7.25–8.65 | 115 | 84 |